United States Patent
Igarashi et al.

(10) Patent No.: US 7,715,314 B2
(45) Date of Patent: May 11, 2010

(54) COMMUNICATION TERMINAL AND RETRANSMISSION CONTROL METHOD

(75) Inventors: Ken Igarashi, Yokohama (JP); Kenichi Yamazaki, Hino (JP)

(73) Assignee: NTT DoCoMo, Inc., Tokyo (JP)

( * ) Notice: Subject to any disclaimer, the term of this patent is extended or adjusted under 35 U.S.C. 154(b) by 434 days.

(21) Appl. No.: 11/693,252

(22) Filed: Mar. 29, 2007

(65) Prior Publication Data
US 2007/0230337 A1  Oct. 4, 2007

(30) Foreign Application Priority Data
Mar. 30, 2006  (JP) ............................. P2006-095805

(51) Int. Cl.
*G01R 31/08* (2006.01)

(52) U.S. Cl. ....................... 370/230; 370/252; 370/229; 709/229; 709/224

(58) Field of Classification Search ................... 455/347
See application file for complete search history.

(56) References Cited

U.S. PATENT DOCUMENTS

| | | | |
|---|---|---|---|
| 6,405,337 B1 * | 6/2002 | Grohn et al. ................. | 714/749 |
| 6,907,460 B2 * | 6/2005 | Loguinov et al. ........... | 709/224 |
| 2002/0124096 A1 * | 9/2002 | Loguinov et al. ........... | 709/230 |
| 2003/0031203 A1 * | 2/2003 | Fukui ......................... | 370/469 |
| 2003/0223422 A1 * | 12/2003 | Igarashi et al. .............. | 370/390 |
| 2004/0165543 A1 * | 8/2004 | Nakazawa .................. | 370/252 |
| 2005/0070246 A1 * | 3/2005 | Qazi et al. .................. | 455/347 |

FOREIGN PATENT DOCUMENTS

| | | |
|---|---|---|
| CN | 1430833 A | 7/2003 |
| KR | 2002-0089478 | 11/2002 |
| WO | WO 01/80476 A1 | 10/2001 |

OTHER PUBLICATIONS

V. Paxson, et al., "Computing TCP's Retransmission Timer", http://www.faqs.org/rfcs/rfc2988.html, RFC 2988 (RFC2988), Section 2-5, Nov. 2000, pp. 1-6.
"Transmission Control Protocol", http://www.faqs.org/rfcs/rfc793.html, RFC 793 (RFC793), Sep. 1981, pp. 1-63.
V. Jacobson, et al., "TCP Extensions for High Performance", http://www.faqs.org/rfcs/rfc1323.html, RFC 1323 (RFC1323), Section 3, May 1992, pp. 1-28.

* cited by examiner

*Primary Examiner*—Chi H Pham
*Assistant Examiner*—Kouroush Mohebbi
(74) *Attorney, Agent, or Firm*—Oblon, Spivak, McClelland, Maier & Neustadt, L.L.P.

(57) ABSTRACT

A retransmission control method of the present invention includes the steps in which a receiving terminal: measures a round trip time (RTT) between the receiving terminal and a sending terminal; calculates an RTO by using the measured RTT; and starts a time counting operation of the RTO upon reception from a point in time when a segment is received from the sending terminal; transmits a segment prompt signal which prompts the sending terminal to transmit a segment, when the segment is not received from the sending terminal until the RTO is completed, and in which the sending terminal: retransmits a segment to the receiving terminal when there is a segment to be retransmitted; and transmits a data-less signal to the receiving terminal when there is a segment that should be retransmitted, the data-less signal indicating that there is no segment that should be retransmitted.

7 Claims, 9 Drawing Sheets

COMMUNICATION TERMINAL AND RETRANSMISSION CONTROL METHOD

CROSS REFERENCE TO RELATED APPLICATION

This application is based upon and claims the benefit of priority from prior Japanese Patent Application P2006-95805 filed on Mar. 30, 2006; the entire contents of which are incorporated by reference herein.

BACKGROUND OF THE INVENTION

1. Field of the Invention

The present invention relates to communication terminals and a retransmission control method for controlling retransmission when performing data communications by using Transport Control Protocol (TCP).

2. Description of the Related Art

Sending terminals and receiving terminals which perform data communications in accordance with TCP used in the internet and the like are currently in wide use. In TCP, in order to achieve reliable data communications, a sending terminal has functions of transmitting a segment, and of re-transmitting the segment when the sending terminal has not received an acknowledgment (ACK) corresponding to the transmitted segment from a receiving terminal for a certain period of time.

In TCP, the sending terminal measures a round trip time (RTT) by using an ACK which the receiving terminal sends back in response to a segment transmitted from the sending terminal; calculates a retransmission timeout (RTO) by using the following set of formulas 1 to 4; and retransmits the segment when the sending terminal has not received an ACK from the receiving terminal before the RTO is completed (for example, refer to V. Paxon and M. Allman, "Computing TCP's Retransmission Tuner," RFC2988, November, 2000).

$$Err = M - A \quad (1)$$

$$A \leftarrow A + gErr \quad (2)$$

$$D \leftarrow D + h(|Err| - D) \quad (3)$$

$$RTO = A + 4D \quad (4)$$

In the formulas 1 to 4, Err denotes a difference between an actually-measured value M and a currently estimated value of the RTT; A denotes a smoothed RTT (a smoothed mean RTT value); D denotes a smoothed mean deviation; g denotes a coefficient of the mean (usually, ⅛); and h denotes a coefficient of the mean (0.25).

Note that an RTT is calculated as follows. Specifically, when a timestamp option is used, the sending terminal calculates the RTT by using a timestamp echo. Alternatively, when the timestamp option is not used, the sending terminal stores a time of transmitting a segment firstly, and then calculates the RTT by receiving an ACK corresponding to the segment previously stored (for example, refer to "Transmission Control Protocol," RFC793, September, 1981, and V. Jacobson, R. Branden, and D. borman, "TCP Extensions for High Performance," RFC1323, May , 1992).

When an ACK has not been returned from the receiving terminal to the sending terminal during the RTO thus calculated, the segment is retransmitted. Thereafter, when the ACK is also not returned, the retransmission of the segment is repeated. In this case, the sending terminal continues retransmitting the segment with the RTO doubled each time (maximum 64 seconds), since a possible reason for the failure of receiving the ACK is that the communication status is poor, for example.

When TCP is used under a wireless environment, handover and phasing cause the wireless environment to be in a poor state. This results in bursty losses of segments, which causes an RTO. In addition, when the segment retransmitted due to an occurrence of the RTO is again lost, the sending terminal cannot retransmit the segment during a time period of the first RTO×2. As a result, the throughput is considerably lowered.

Figure 1:
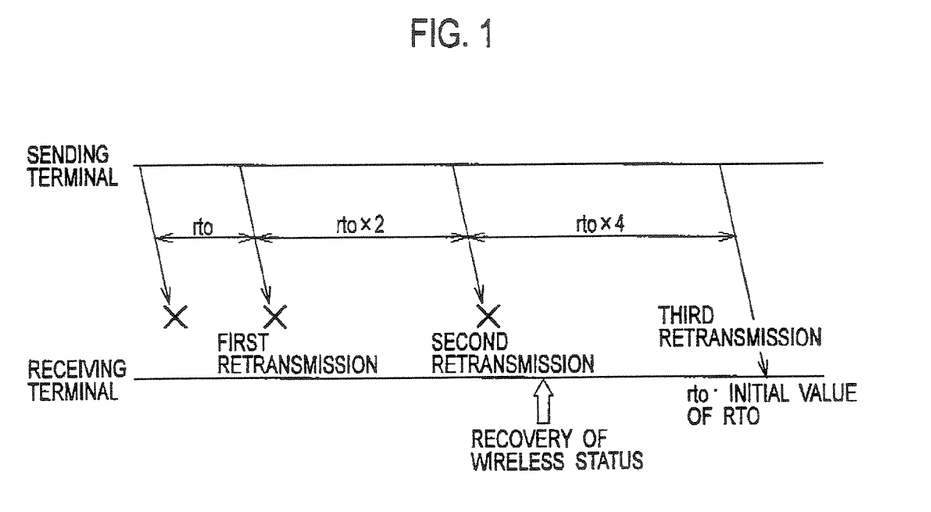
FIG. 1 is a diagram for explaining problems to be solved by the present invention.

FIG. 1 shows a state in which the throughput is lowered. When an ACK is not returned for a certain period of time because a first segment is lost due to a poor state of the wireless environment, the segment is retransmitted at the first attempt in response to an occurrence of the RTO. When the receiving terminal does not receive the segment retransmitted at the first attempt, the sending terminal retransmits the segment at the second attempt after the time period of the RTO×2 elapses. When the receiving terminal does not receive the segment transmitted at the second attempt as well, the sending terminal retransmits the segment at the third attempt after the time period of the RTO×4.

In this way, the time period until the retransmission of the segment increases every time the retransmitted segment is lost. Accordingly, when the retransmitted segment is lost, the sending terminal does not retransmit the segment immediately regardless of the recovery of the wireless status of the receiving terminal. As a result, in spite of a status in which segments can be exchanged between the sending terminal and the receiving terminal, the segments are not transmitted, and thereby the throughput is lowered.

These problems can be mitigated by shortening the time period of the RTO, or by causing the RTO not to be doubled at a time of the segment retransmission. However, when the RTT varies due to a retransmission technique or the like used in a wireless link, another problem occurs that a segment is retransmitted even though the segment is not lost. In addition, there is still another problem that a wasteful retransmission is repeated when the wireless status of the receiving terminal does not recover.

SUMMARY OF THE INVENTION

In consideration of the foregoing problems, an object of the present invention is to provide communication terminals and a retransmission control method which are capable of improving throughput by achieving an early retransmission of a segment.

A first aspect of the present invention for achieving the foregoing object is a communication terminal configured to receive a segment transmitted by a different terminal, comprising: a round trip time measuring unit configured to measure a round trip time between the communication terminal and the different terminal; a retransmission timeout time calculator configured to calculate a retransmission timeout time by using the round trip time in order to estimate a retransmission timeout time set in the different terminal; a timer configured to start a time counting operation of the retransmission timeout time when the segment is received from the different terminal; and a segment prompt transmitter configured to transmit, to the different terminal, a segment prompt signal for prompting the different terminal to transmit the segment when the segment is not received from the different terminal during a time from the start of the time counting operation to the completion of the retransmission timeout time.

In the first aspect, the communication terminal may further include a round trip time increasing unit configured to increase a round trip time to be measured by the different terminal, by manipulating an acknowledgement to be transmitted to the different terminal.

In the first aspect, the timer may restart the time counting operation when the segment is received from the different terminal after the segment prompt signal is transmitted, and the timer may cancel a restart of the time counting operation until a new segment is received when a data-less signal is received from the different terminal after the segment prompt signal is transmitted, the data-less signal indicating that there is no segment that should be retransmitted.

In the first aspect, the communication terminal may further include an application detector configured to detect an application executed by the different terminal, wherein the segment prompt transmitter determines whether or not to transmit the segment prompt signal to the different terminal in accordance with the application detected by the application detector.

A second aspect of the present invention is a communication terminal configured to transmit a segment to a different terminal, comprising: a segment receiver configured to receive a segment prompt signal which requests a retransmission of the segment; and a segment retransmitter configured to retransmit a segment to the receiving terminal when there is a segment that should be transmitted, and to transmit a data-less signal to the receiving terminal when there is no segment that should be retransmitted, the data-less signal indicating that there is no segment that should be retransmitted.

A third aspect of the present invention is a retransmission control method for controlling a retransmission of a segment transmitted from a first communication terminal to a second communication terminal, comprising the steps of: measuring, at the second communication terminal, a round trip time between the first and second communication terminals; calculating, at the second communication terminal, a retransmission timeout time by using the round trip time in order to estimate a retransmission timeout time set in the first communication terminal; starting, at the second communication terminal, a time counting operation of the retransmission timeout time when the segment is received from the first communication terminal; transmitting, from the second communication terminal to the first communication terminal, a segment prompt signal for prompting the first terminal to transmit the segment when the segment is not received to the second communication terminal from the first communication terminal during a time from the start of the time counting operation to the completion of the retransmission timeout time; receiving, at the first communication terminal, the segment prompt signal from the second communication terminal; retransmitting, at the first communication terminal, a segment to the second communication terminal when there is a segment that should be retransmitted; and transmitting, at the first communication terminal, a data-less signal to the second communication terminal when there is no segment that should be retransmitted, the data-less signal indicating that there is no segment that should be retransmitted.

According to the present invention, it is possible to provide communication terminals and a retransmission control method which are capable of increasing throughput by achieving an early retransmission of a segment.

DETAILED DESCRIPTION OF THE INVENTION

Hereinafter, descriptions will be provided of embodiments of the present invention by referring to the accompanying drawings. In the descriptions of the drawings of the following embodiments, the same or similar reference numerals are given to the same or similar components.

(Communication System)

Figure 2A:
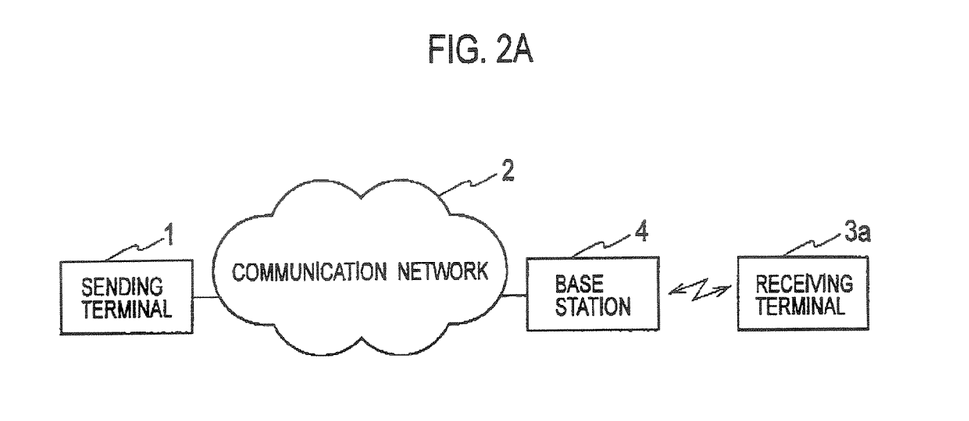
FIG. 2A is a diagram showing an example of an entire configuration of a communication system according to an embodiment of the present invention.

As shown in FIG. 2A, a communication system according to an embodiment of the present invention includes a sending terminal 1 and a base station 4 which are connected to a communication network 2; and a receiving terminal 3a which communicates with the base station 4.

The communication network 2 is, for example, a mobile communication network, the Internet, or the like. As the base station 4, not only a mobile base station or a PHS base station, but also an access point (AP) of a wireless local area network (LAN) may be employed. The receiving terminal 3a receives a segment transmitted from the sending terminal 1 through the communication network 2 and the base station 4.

The sending terminal 1 is a server apparatus configured of a computer and the like. A mobile phone terminal, a PHS, a laptop PC having a wireless communication function, or a personal digital assistance (PDA) having a wireless communication function can be used as the receiving terminal 3a.

The sending terminal 1 and the receiving terminal 3a communicate with each other in accordance with TCP located on the transport layer of the OSI reference model. The receiving terminal 3a and the base station 4 communicate with each other through a wireless network in accordance with RLC (Radio Link Control) protocol and the like, located on the data link layer. Note that the RLC protocol was proposed in the 3GPP (the 3rd Generation Partnership Project), and standardized for wireless link control.

Figure 2B:
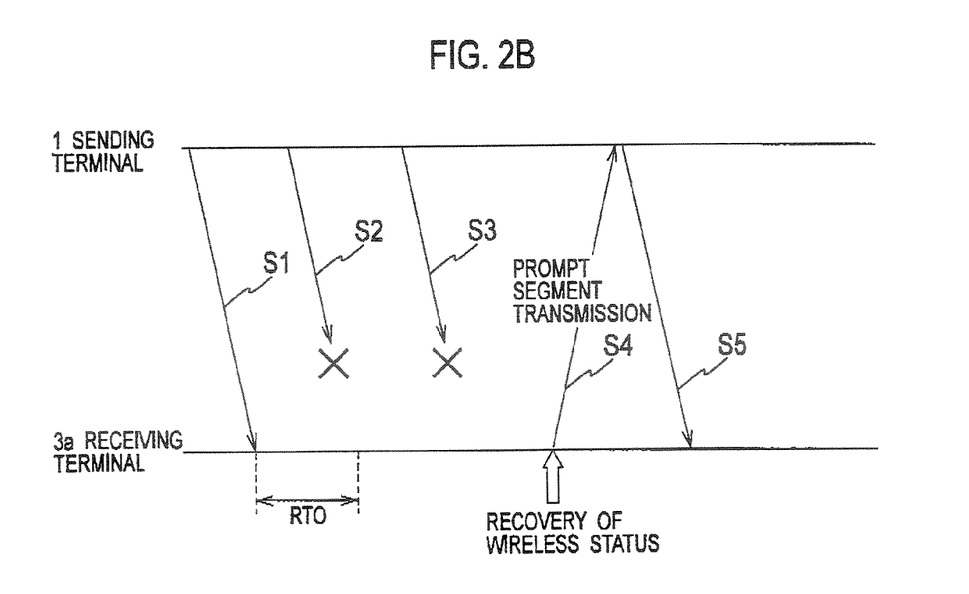
FIG. 2B is a diagram showing an outline of a retransmission control method according to the embodiment of the present invention.

Hereinbelow, by using FIG. 2B, descriptions will be provided of an outline of a method of controlling retransmissions between the sending terminal 1 and the receiving terminal 3a according to the embodiment of the present invention.

In step S1, the sending terminal 1 transmits a segment to the receiving terminal 3a. Upon receipt of the segment, the receiving terminal 3a measures an RTT between the sending terminal 1 and the receiving terminal 3a, by using a below-described method.

The receiving terminal 3a calculates an RTO from the measured RTT by using the formulas 1 to 4, for the purpose of estimating an RTO which is to be set in the sending terminal 1. The receiving terminal 3a starts a time counting operation of the RTO from a point in time when the segment is received.

In steps S2 and S3, the wireless status becomes poor, and thereby segments transmitted by the sending terminal 1 are lost on the way to the receiving terminal 3a. When the receiving terminal 3a does not receive a segment from the sending terminal 1 during a time period from the start of the time counting operation to the completion of the RTO, the receiving terminal 3a determines that the segment is lost on the way.

In step S4, when the wireless status is recovered, the receiving terminal 3a transmits, to the sending terminal 1, a segment prompt signal which prompts the sending terminal 1 to transmit the segment. The sending terminal 1 receives the segment prompt signal from the receiving terminal 3a.

In step S5, when there is a segment that should be retransmitted, the sending terminal 1 retransmits the segment to the receiving terminal 3a. In contrast, when there is no segment that should be retransmitted, the sending terminal 1 transmits, to the receiving terminal 3a, a data-less signal indicating that there is no segment that should be retransmitted.

In this way, the receiving terminal 3a according to the embodiment of the present invention also calculates the RTO which is usually calculated only in the sending terminal 1. When the receiving terminal 3a does not receive a segment before the RTO is completed, the receiving terminal 3a waits for the recovery of the wireless status, and then transmits, to the sending terminal 1, a segment prompt signal which prompts the sending terminal 1 to transmit the segment. Thus, an earlier transmission of the segment is possible.

(Receiving Terminal)

Figure 3:
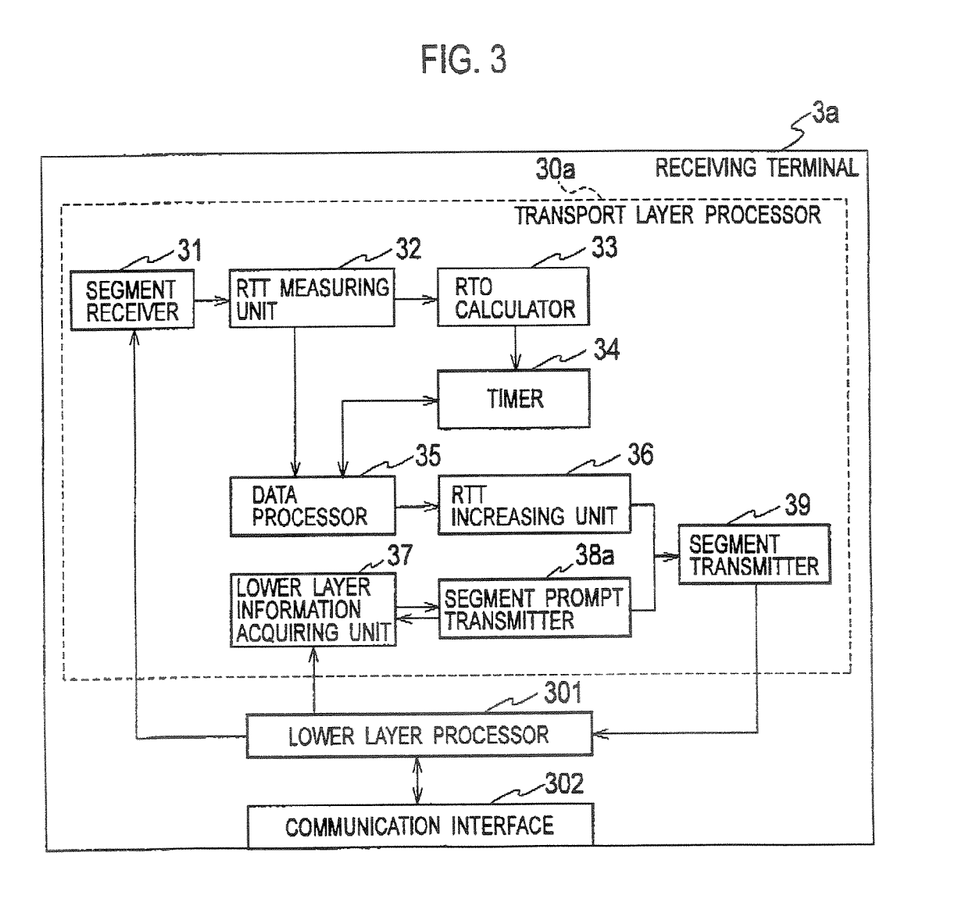
FIG. 3 is a block diagram showing an example of a functional configuration of a receiving terminal according to the embodiment of the present invention.

Here, a configuration of the receiving terminal 3a shown in FIG. 2A is described. As shown in FIG. 3, the receiving terminal 3a according to the embodiment of the present invention includes a transport layer processor 30a, a lower layer processor 301 and a communication interface 302.

The lower layer processor 301 includes a data-link layer processor, a network layer processor and the like, which are not illustrated. The data-link layer processor converts a frame received by the communication interface 302 into packets, and passes the packets to the network layer processor. The data-link layer processor converts packets passed from the network layer processor into a frame, and transmits the frame through the communication interface 302.

Note that, a packet is a data block of a unit of communication in the network layer, and includes the foregoing segments and a packet header. A frame is a data block of a unit of communication in the data link layer, and includes the foregoing packets and a frame header.

The network layer processor converts a packet passed from the data-link layer processor into segments, and passes the segments to the transport layer processor 30a. The network layer processor converts the segments passed from the transport layer processor 30a into a packet, and passes the packet to the data-link layer processor.

The transport layer processor 30a includes a segment receiver 31, an RTT measuring unit 32, an RTO calculator 33, a timer 34, a data processor 35, an RTT increasing unit 36, a lower layer information acquiring unit 37, a segment prompt transmitter 38a and a segment transmitter 39.

The RTT measuring unit 32 measures an RTT. Specifically, when a segment transmitted from the sending terminal 1 includes a timestamp echo corresponding to a timestamp which the receiving terminal 3a has attached to an ACK, the RTT measuring unit 32 acquires, as the RTT, a value calculated by subtracting the timestamp echo included in the segment from the time of receiving the segment.

In contrast, when a segment including data transmitted from the sending terminal 1 does not include a timestamp echo corresponding to a timestamp which the receiving terminal 3a has attached to an ACK, the RTT measuring unit 32 measures an RTT in any one of the following methods:

obtain a time period from a time when the ACK is transmitted, to a time when a segment including an ACK and an advertised window is received;

increase the sequence number by one by adding empty data and a timestamp to an ACK, and then obtain a value by subtracting a timestamp echo included in an ACK that is transmitted from the sending terminal 1, from a time of reception of the ACK; and     use PING (ICMP RFC792).

By using the formulas 1 to 4, the RTO calculator 33 calculates an RTO from the RTT measured by the RTT measuring unit 32. The RTO calculated by the RTO calculator 33 is set in the timer 34.

The timer 34 starts the time counting operation of the RTO from a point in time when a segment is received from the sending terminal 1. Note that, when the receiving terminal 3a receives a segment from the sending terminal 1 after transmitting a segment prompt signal, the timer 34 restarts the time counting operation.

In contrast, when the receiving terminal 3a receives a data-less signal from the sending terminal 1 after transmitting a segment prompt signal, the timer 34 does not restart the time counting operation until a new segment is received. Here, the data-less signal indicates that there is no segment that should be retransmitted.

The data processor 35 executes predetermined data processing for segments.

The RTT increasing unit 36 increases the RTT, which is to be measured by the sending terminal 1, by manipulating an ACK to be transmitted to the sending terminal 1. As a result, it is possible to avoid the problem that a segment is retransmitted even though the segment is not lost, when the RTT varies due to the retransmission technique used in the wireless link.

To be more precise, by using any one of the following methods A and B, the RTT increasing unit 36 manipulates an ACK to control an RTO to be measured by the sending terminal 1.

A. When the timestamp option is used, the RTT increasing unit 36 returns a segment with a value that indicates an earlier time than usual ones in a timestamp echo field. Here, the value of the timestamp echo should be equal to or greater than that included in the ACK which has been previously returned to the sending terminal 1.

For example, suppose that a segment including the timestamp of the value 5.00 is received when the value 1.00 has been already returned as the timestamp echo to the sending terminal 1. In this case, usually, the value 5.00 is returned as the timestamp echo. This time, however, the value within a range of 1.00 to 5.00 is returned as the timestamp echo in order to increase the RTO to be measured by the sending terminal 1.

In consideration of variations in RTTs measured by the RTT measuring unit 32 and of the like, as the value of the timestamp echo to be returned, applied is a value which allows the RTO, which is to be set in the sending terminal 1, to fully cover the variations in the RTTs.

B. When the timestamp option is not used, the RTT increasing unit 36 causes the RTO, which is to be measured by the sending terminal 1, to increase by delaying the timing of returning the ACK. As is the case with the foregoing method A, the delayed timing of returning the ACK is set so that the value of the RTO to be set in the sending terminal 1 can fully cover the variations in the RTTs.

Incidentally, when, by adding a special option to the segment, the sending terminal 1 can notify the receiving terminal 3a of a segment targeted for measuring the RTT, the receiving terminal 3a delays the timing of returning the ACK corresponding to only the segment to which the special option is added.

When the receiving terminal 3a has not received any segment from the sending terminal 1 from a time when the timer 34 starts the time counting operation, until a time when the RTO is completed, the segment prompt transmitter 38a determines that a segment is lost, and transmits a segment prompt signal to the sending terminal 1.

Note that, when the lower layer information acquiring unit 37 can acquire information on a lower layer, the segment prompt transmitter 38a transmits a segment prompt signal by referring to the information on the lower layer.

To be more precise, the segment prompt transmitter 38a cancels the transmission of the segment prompt signal when a segment is retransmitted in the lower layer. Thereafter, when the segment receiver 31 receives a segment, or where the segment retransmission in the lower layer fails, the segment prompt transmitter 38a transmits the segment prompt signal.

For example, when RLC protocol is used in the lower layer, the lower layer information acquiring unit 37 can check whether or not the segment is retransmitted in the lower layer, by referring to information on an automatic repeat request (ARQ). Alternatively, the lower layer information acquiring unit 37 can also determine whether or not a segment is retransmitted in a specific connection, by referring to a segment held in retransmission buffer which is not shown in the drawings.

Even when a complete segment is not stored in the retransmission buffer, there is a case where stored is a protocol data unit (PDU) having recognizable TCP/IP header information. In this case, the lower layer information acquiring unit 37 can determine whether or not the segment is retransmitted.

Furthermore, when the classification and prioritization in the data link layer is carried out in each connection in accordance with Priority Control, the lower layer information acquiring unit 37 can identify the connection for the segment only by using information in the data link layer.

Figure 4:
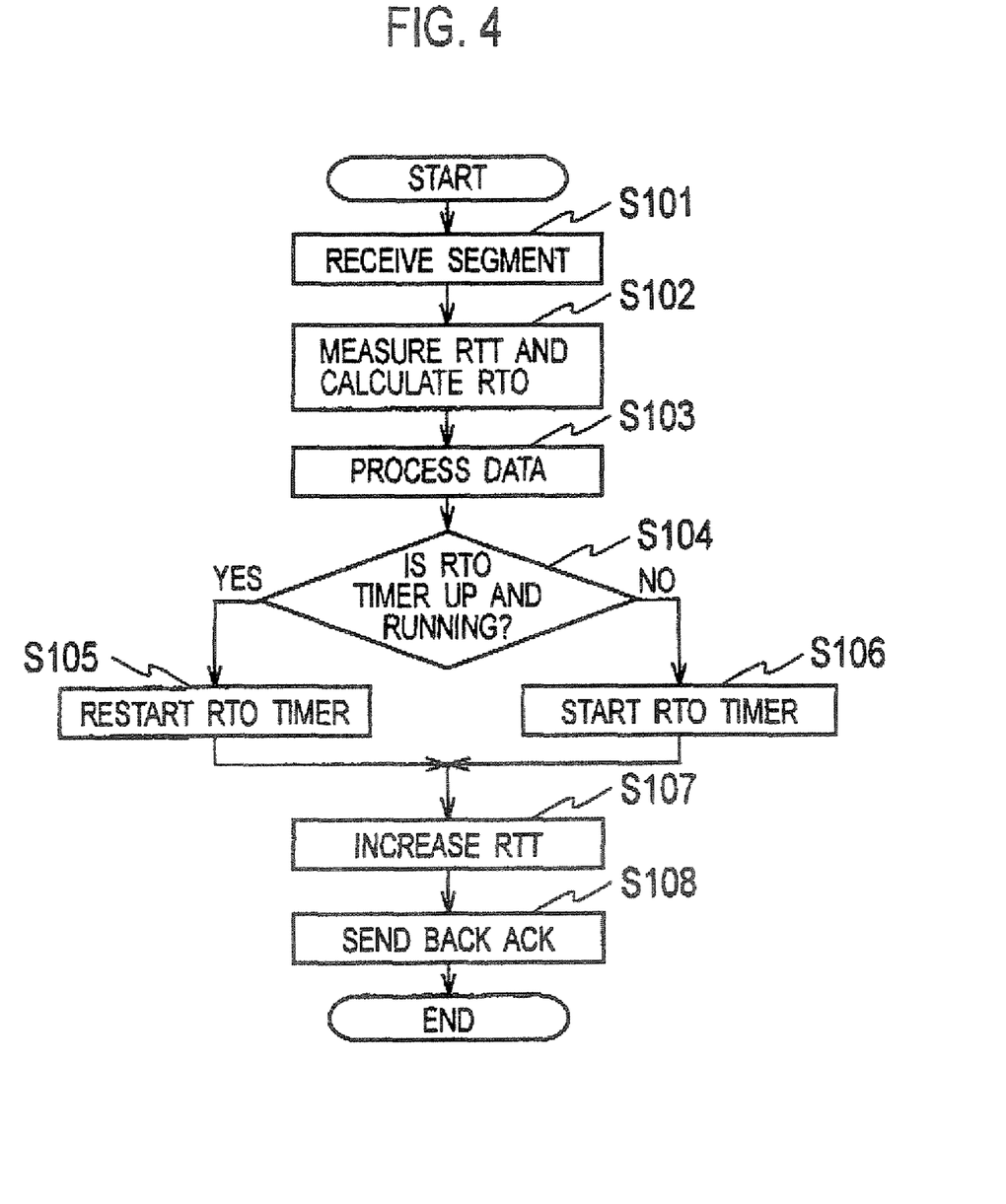
FIG. 4 is a first flowchart showing an operational example of the receiving terminal according to the embodiment of the present invention.
Figure 5:
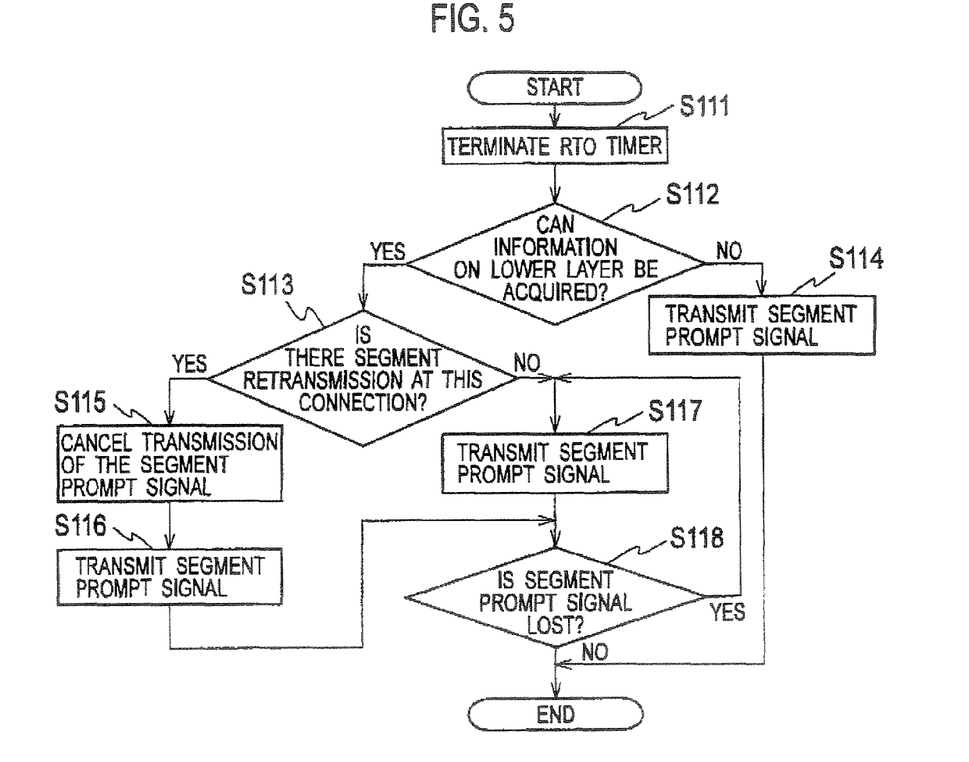
FIG. 5 is a second flowchart showing an operational example of the receiving terminal according to the embodiment of the present invention.

Hereinafter, descriptions will be given of an operational example of the receiving terminal 3a according to the embodiment of the present invention by referring to flow-charts shown in FIGS. 4 and 5.

(A) Firstly, an operation when the receiving terminal 3a receives a segment from the sending terminal 1 will be described.

In step S101, upon reception of a segment, the segment receiver 31 transmits the segment to the RTT measuring unit 32.

In step S102, the RTT measuring unit 32 measures an RTT. In addition, the RTO calculator 33 calculates an RTO by using the RTT measured by the RTT measuring unit 32. The RTO thus calculated is set in the timer 34.

In step S103, the data processor 35 performs predetermined data processing.

In step S104, the data processor 35 determines whether or not the timer 34 is up and running. When it is determined that the timer 34 is up and running, the data processor 35 restarts the timer 34 in step S105. When it is determined that the timer 34 is not up and running, the data processor 35 starts the timer 34 in step S106.

In step S107, the RTT increasing unit 36 generates an ACK corresponding to the received segment, and performs processing for increasing the RTT.

In step S108, the segment transmitter 39 returns the ACK to the sending terminal 1.

(B) Next, an operation when the receiving terminal does not receive a segment before the completion of the RTO counted by the timer 34.

In step S111, the RTO counted by the timer 34 is completed.

In step S112, the segment prompt transmitter 38a makes an inquiry to the lower layer information acquiring unit 37, and determines whether or not retransmission information on the segment can be acquired from the lower layer. When it is determined that the retransmission information on the segment cannot be acquired from the lower layer, the segment prompt transmitter 38a transmits the segment prompt signal immediately, in step S114.

When it is determined that the retransmission information on the segment can be acquired, the processing moves to step S113.

In step S113, the segment prompt transmitter 38a makes an inquiry to the lower layer information acquiring unit 37 about whether or not the segment has been retransmitted in this connection. When it is determined that the segment is retransmitted in this connection, the processing moves to step S115.

In step S115, the segment prompt transmitter 38a cancels the transmission of a segment prompt signal.

In step S116, the segment prompt transmitter 38a transmits the segment prompt signal when the receiving terminal 3a receives a segment, or where the retransmission in the lower layer fails.

On the other hand, when it is determined that the segment has not been retransmitted at this connection in step S113, the processing moves to step S117.

In step S117, The segment prompt transmitter 38a transmits a segment prompt signal to the sending terminal 1.

In step S118, the lower layer information acquiring unit 37 checks whether or not the segment prompt signal has been normally transmitted. When it is determined that the segment prompt signal has been lost, the processing goes back to step S117, and the segment prompt transmitter 38a again transmits a segment prompt signal to the sending terminal 1.

As has been described in detail hereinbefore, the receiving terminal 3a according to the embodiment of the present invention allows a segment to be retransmitted earlier by transmitting a segment prompt signal to the sending terminal 1 when the RTO counted by the timer 34 is completed.

Moreover, the RTT increasing unit 36 manipulates an ACK so that the RTT to be measured by the sending terminal 1 would increase. This makes it possible to control the variations in the RTO calculated by the sending terminal 1 even when the wireless status varies. Thus, the receiving terminal 3a can avoid a wasteful retransmission of a segment, which would be performed in response to the RTO.

(Sending Terminal)

Descriptions will be given of a configuration of the sending terminal according to the embodiment of the present invention. Note that the descriptions of the configuration same as that of the foregoing receiving terminal 3a will be omitted here, since the descriptions overlap the foregoing ones.

Figure 6:
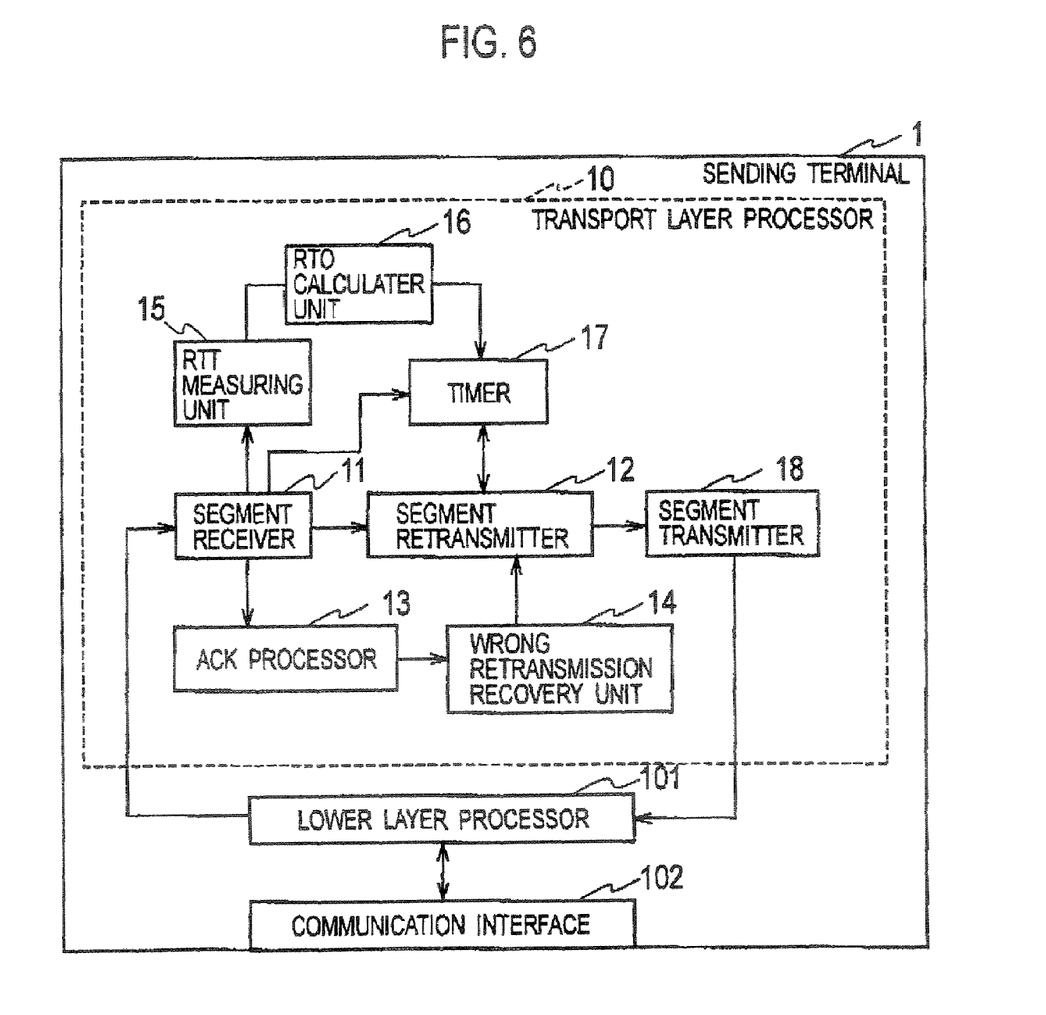
FIG. 6 is a block diagram showing an example of a functional configuration of a sending terminal according to the embodiment of the present invention.

As shown in FIG. 6, the sending terminal 1 according to the embodiment of the present invention includes a transport layer processor 10, a lower layer processor 101 and a communication interface 102.

The transport layer processor 10 includes a segment receiver 11, a segment retransmitter 12, an ACK processor 13, a wrong retransmission recovery unit 14, an RTT measuring unit 15, an RTO calculator 16, a timer 17 and a segment transmitter 18. The segment receiver 11 receives a segment, an ACK, a segment prompt signal and the like from the receiving terminal 3a.

The RTT measuring unit 15 measures an RTT by using an ACK. The RTO calculator 16 calculates an RTO from the RTT measured by the RTT measuring unit 15 by using the formulas 1 to 4. The timer 17 starts a time counting operation of the RTO from a point in time when the sending terminal 1 transmits a segment to the receiving terminal 3a. Note that the timer 17 is reset upon receipt of an ACK from the receiving terminal 3a.

When there is a segment that should be retransmitted, in response to the segment prompt signal, the segment retransmitter 12 retransmits the segment that should be retransmitted. When there is no segment that should be retransmitted, the segment retransmitter 12 transmits, to the receiving terminal 3a, a data-less signal indicating that there is no segment that should be retransmitted.

The ACK processor 13 processes an ACK returned from the receiving terminal 3a. At this time, by referring to D-SACK (Duplicate Selective Acknowledgment) information and the like included in the ACK, the ACK processor 13 determines whether or not the receiving terminal 3a has received more than once the segment that has been retransmitted in the immediately-previous retransmission.

When a D-SACK corresponding to a segment retransmitted to the receiving terminal 3a is returned, the ACK processor 113 recognizes that the immediately-previous retransmission is a wrong retransmission.

When ACK processor 13 determines that the immediately-previous retransmission is a wrong retransmission, the wrong retransmission recovery unit 14 compares a value of a congestion window held in the segment retransmitter 12, with a value of the current SSTHRESH.

When the value of the SSTHRESH is smaller than the value of the congestion window held in the segment retransmitter 12, the value of the SSTHRESH is set in the value of the congestion window held in thee segment retransmitter 12.

Figure 7:
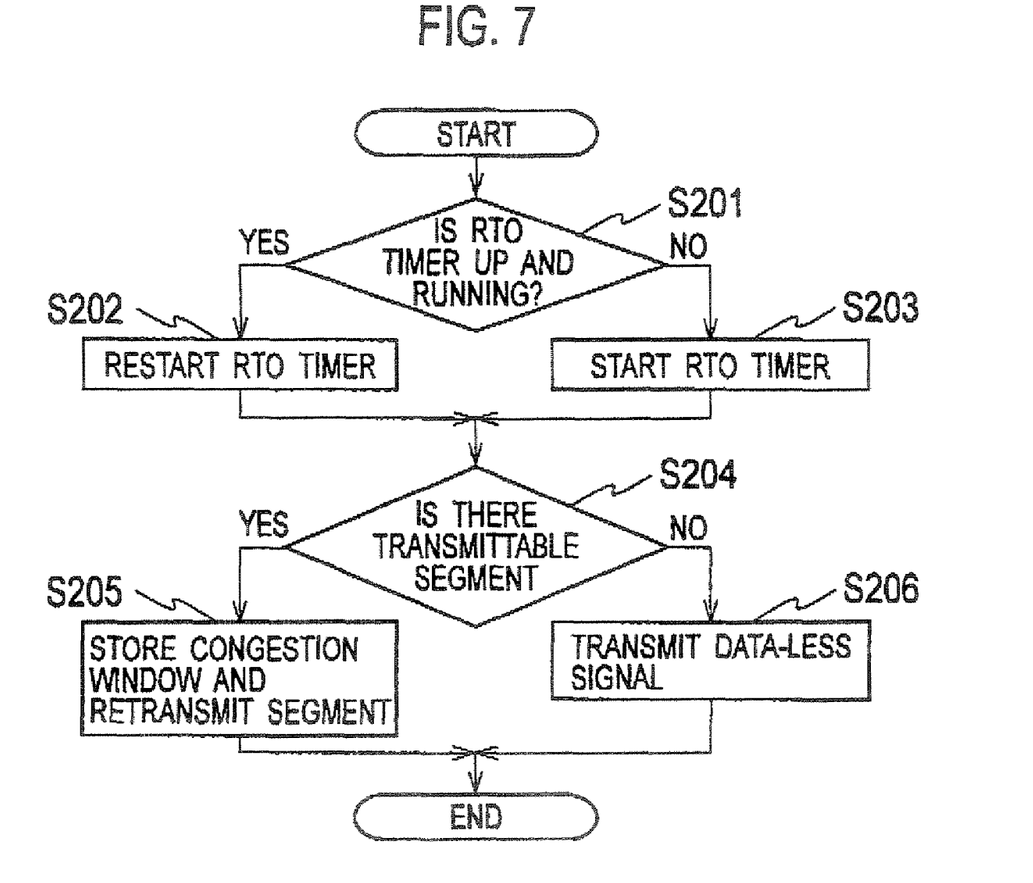
FIG. 7 is a flowchart showing an operational example of the sending terminal according to the embodiment of the present invention.

Hereinafter, an operational example of the sending terminal 1 according to the embodiment of the present invention will be described by referring to a flowchart shown in FIG. 7. In particular, the descriptions will be given of the operation after the sending terminal 1 receives a segment prompt signal from the receiving terminal 3a.

In step S201, the segment receiver 11, which receives the segment prompt signal, determines whether or not the timer 17 is up and running. When the segment receiver 11 determines that the timer 17 is up and running, the processing moves to step S202, and the segment receiver 11 restarts the timer 17. In contrast, when the segment receiver 11 determines that the timer 17 is not up and running, the processing moves to step S203, and the segment receiver 11 starts the timer 17.

The segment prompt signal received by the segment receiver 11 is transferred to the segment retransmitter 12, and then the segment retransmitter 12 determines whether or not there is a transmittable segment in step S204. When it is determined that there is a transmittable segment, the processing moves to step S205. When it is determined that there is no transmittable segment, the processing moves to step S206.

In step S205, as is the case with a usual processing which is performed in accordance with TCP when the RTO is completed, the segment retransmitter 12 transmits segments, whose ACKs have not been received, in ascending order of the segment size. At this time, the segment transmitter 12 stores information on the congestion window which has been used before this transmission of the segments. The retransmitted segments are transferred to the receiving terminal 3a through the segment transmitter 18.

In step S206, to the receiving terminal 3a, the segment retransmitter 12 transmits a special message (data-less) indicating that there is no date to be transmitted.

The sending terminal 1 according to the embodiment of the present invention transmits a segment, which should be retransmitted, to the receiving terminal 3a in response to a segment prompt signal. Thus, the sending terminal 1 can achieve an early retransmission of segment.

(Modified Example of Receiving Terminal)

Figure 8:
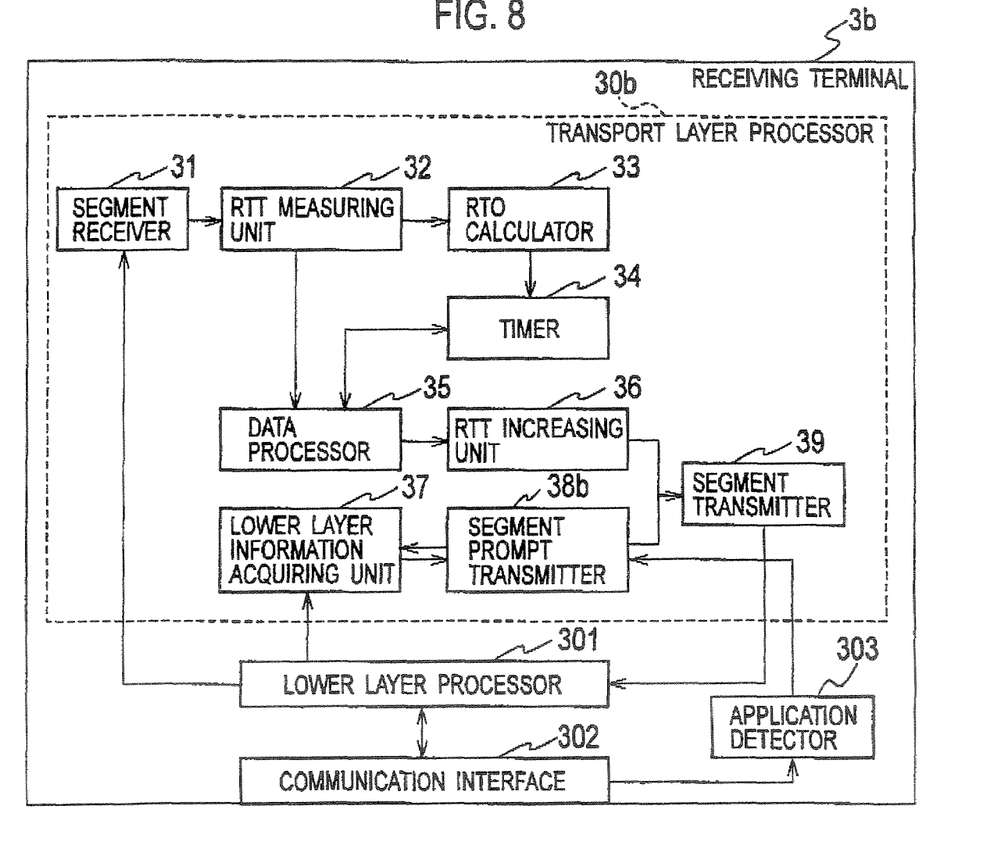
FIG. 8 is a block diagram showing a functional configuration of a receiving terminal according to a modified example of the embodiment of the present invention.

A receiving terminal according to a modified example of the embodiment of the present invention is shown in FIG. 8. The receiving terminal 3b shown in FIG. 8 is different from that shown in FIG. 3 in the point that the receiving terminal 3b further includes an application detector 303.

The application detector 303 detects an application which is executed by the sending terminal 1. For instance, the application detector 303 detects an application used for communications, by using an explicit signal transmitted from the application, or by performing analogical reasoning based on the port number used for communications. A segment prompt transmitter 38b determines whether or not to transmit a segment prompt signal to the sending terminal 1, according to the application thus detected.

In this way, the receiving terminal 3b identifies the application used in the sending terminal 1. With this operation, it is possible to prevent the receiving terminal 3b from transmitting a wasteful segment prompt signal. For example, in a case of an application, such as a telnet, WWW (World Wide Web) or an FTP (File Transfer Protocol), which does not cause a bursty data transfer to be performed, the sending terminal 1 may not hold any segment. In such a case, it is not necessary to transmit a segment prompt signal.

Other Embodiments

As has been described above, the present invention has been described by using the embodiments. However, it should not be understood that the descriptions and the drawings constituting part of this disclosure limit the present invention. It is obvious to one skilled in the art that various alternative embodiments, examples and applied techniques can be made from this disclosure.

Figure 9:
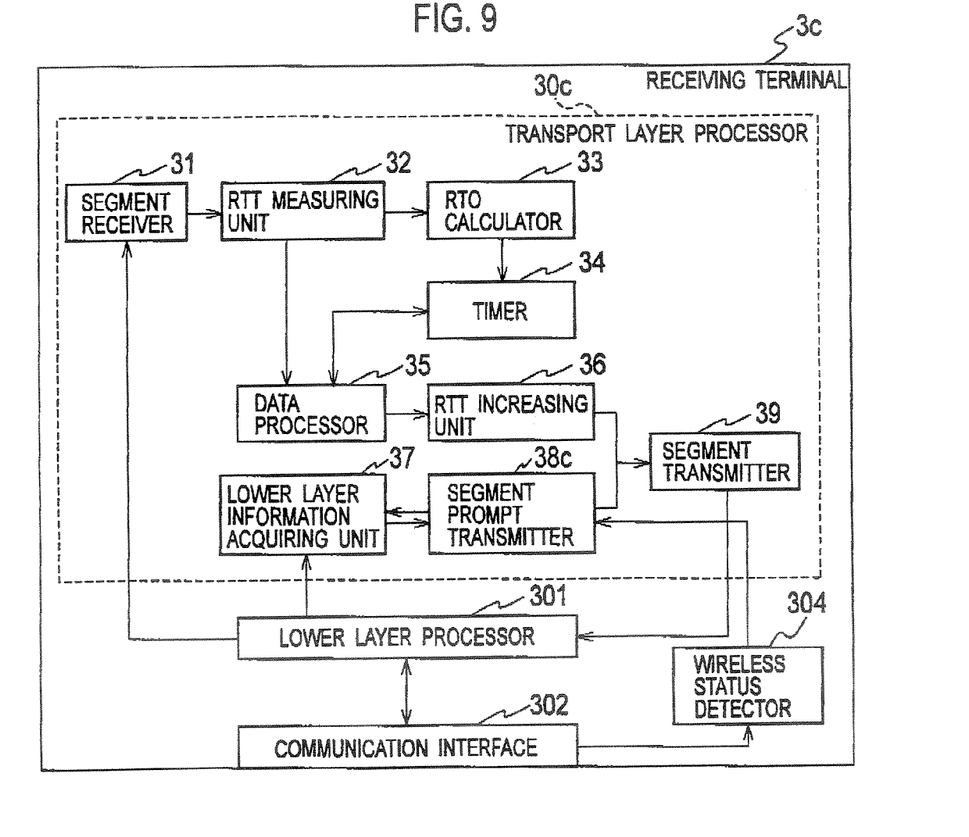
FIG. 9 is a block diagram showing an example of a functional configuration of a receiving terminal according to another embodiment of the present invention.

As shown in FIG. 9, a receiving terminal 3c according to another embodiment may have a configuration further including a wireless status detector 304 which detects a wireless status. When the wireless status detector 304 detects a recovery of the wireless status after an RTO is completed, the segment prompt transmitter 38c transmits a segment prompt signal to the sending terminal 1.

Note that the wireless status detector 304 detects the recovery of the wireless status by using information on a pilot channel transmitted from the base station 4, for example. With the receiving terminal 3c of this embodiment, it is possible to reduce a repetition of steps S117 and S118 shown in FIG. 8.

The function of the RTT increasing unit 36 of any of the receiving terminals 3a to 3c according to the foregoing embodiments can be used alone for the purpose of preventing a wrong operation performed by the RTO calculator 16 of the sending terminal 1 in a network where the RTT varies heavily.

Moreover, as the segment prompt signal, the segment prompt transmitters 38a to 38c of the receiving terminals 3a to 3c may use a signal indicating a D-ACK (duplicate acknowledgement), which is normally used in the TCP. When a retransmitted segment is lost a plurality of times, it is possible to reduce the time until the next segment transmission by using the D-ACK, even without having the lower layer information acquiring unit 37 or the RTT increasing unit 36, or having to modify the sending terminal 1.

Hereinabove, the example of the communication system configured of the wireless communication system has been described, but a configuration may be adopted in which the sending terminal 1 and the receiving terminal 3a or 3b are connected with each other through a cable communication network. In this case, a personal computer or the like can be used as the receiving terminal 3a or 3b.

It should be understood that, as described above, the present invention includes various embodiments which are not described in this disclosure. Accordingly, the present invention should be limited only by the scope of the invention as defined by the appended claims appropriate for this disclosure.

What is claimed is:

1. A communication terminal configured to receive a plurality of segments transmitted by a different terminal, comprising:
    a round trip time measuring unit configured to measure a round trip time between the communication terminal and the different terminal;
    a retransmission timeout time calculator configured to calculate a retransmission timeout time by using the round trip time in order to estimate a retransmission timeout time set in the different terminal;
    a timer configured to start a time counting operation of the retransmission timeout time when a first segment of the plurality of segments is received from the different terminal; and
    a segment prompt transmitter configured to transmit, to the different terminal, a segment prompt signal for prompting the different terminal to transmit a second segment which should be transmitted after the first segment from the different terminal, when the second segment is not received from the different terminal during a time from the start of the time counting operation to the completion of the retransmission timeout time.

2. The communication terminal according to claim 1, further comprising a round trip time increasing unit configured to increase a round trip time to be measured by the different terminal, by manipulating an acknowledgement to be transmitted to the different terminal.

3. The communication terminal according to claim 1, wherein
    the timer restarts the time counting operation when the second segment is received from the different terminal after the segment prompt signal is transmitted, and
    the timer cancels a restart of the time counting operation until a new segment is received when a data-less signal is received from the different terminal after the segment prompt signal is transmitted, the data-less signal indicating that there is no segment that should be retransmitted.

4. The communication terminal according to claim 1, further comprising an application detector configured to detect an application executed by the different terminal, wherein
    the segment prompt transmitter determines whether or not to transmit the segment prompt signal to the different terminal in accordance with the application detected by the application detector.

5. A communication system controlling a retransmission of a plurality of segments transmitted from a first communication terminal to a second communication terminal, wherein
    the second communication terminal comprising:
        a round trip time measuring unit configured to measure a round trip time between the first communication terminal and the second communication terminal;
        a retransmission timeout time calculator configured to calculate a retransmission timeout time by using the round trip time in order to estimate a retransmission timeout time set in the first communication terminal;
        a timer configured to start a time counting operation of the retransmission timeout time when a first segment of the plurality of segments is received from the first communication terminal; and
        a segment prompt transmitter configured to transmit, to the first communication terminal, a segment prompt signal for prompting the first communication terminal to transmit a second segment which should be transmitted after the first segment from the first communication terminal, when the second segment is not received from the first communication terminal during a time from the start of the time counting operation to the completion of the retransmission timeout time,
    the first communication terminal comprising:
        a segment receiver configured to receive the segment prompt signal; and
        a segment retransmitter configured to retransmit a segment to the receiving terminal when there is a segment that should be transmitted, and to transmit a data-less signal to the second communication terminal when there is no segment that should be retransmitted, the data-less signal indicating that there is no segment that should be retransmitted.

6. A retransmission control method for controlling a retransmission of a plurality of segment transmitted from a first communication terminal to a second communication terminal, comprising the steps of:
    measuring, at the second communication terminal, a round trip time between the first and second communication terminals;
    calculating at the second communication terminal, a retransmission timeout time by using the round trip time in order to estimate a retransmission timeout time set in the first communication terminal;
    starting, at the second communication terminal, a time counting operation of the retransmission timeout time when a first segment of the plurality of segments is received from the first communication terminal;

transmitting, from the second communication terminal to the first communication terminal, a segment prompt signal for prompting the first terminal to transmit a second segment which should be transmitted after the first segment from the different terminal, when the second segment is not received to the second communication terminal from the first communication terminal during a time from the start of the time counting operation to the completion of the retransmission timeout time;

receiving, at the first communication terminal, the segment prompt signal from the second communication terminal;

retransmitting, at the first communication terminal, a segment to the second communication terminal when there is a segment that should be retransmitted; and transmitting, at the first communication terminal, a data-less signal to the second communication terminal when there is no segment that should be retransmitted, the data-less signal indicating that there is no segment that should be retransmitted.

7. The communication terminal according to claim 1, wherein the segment prompt signal is transmitted to the different terminal when the retransmission timeout period has expired and when a wireless status between the communication terminal and the different terminal has recovered after having a status insufficient to allow segment to be sent from the different terminal to the communication terminal.

* * * * *